United States Patent
Yazawa et al.

(10) Patent No.: US 7,643,246 B2
(45) Date of Patent: Jan. 5, 2010

(54) PERPENDICULAR MAGNETIC RECORDING HEAD HAVING A STEPPED PORTION AND METHOD OF MANUFACTURING THE SAME

(75) Inventors: Hisayuki Yazawa, Niigata-ken (JP); Toshinori Watanabe, Niigata-ken (JP)

(73) Assignee: TDK Corporation, Tokyo (JP)

(*) Notice: Subject to any disclaimer, the term of this patent is extended or adjusted under 35 U.S.C. 154(b) by 353 days.

(21) Appl. No.: 11/518,723

(22) Filed: Sep. 11, 2006

(65) Prior Publication Data

US 2007/0064343 A1 Mar. 22, 2007

(30) Foreign Application Priority Data

Sep. 22, 2005 (JP) .............................. 2005-275558

(51) Int. Cl.
*G11B 5/187* (2006.01)
*G11B 5/23* (2006.01)

(52) U.S. Cl. .............................. 360/125.2; 360/125.21; 360/125.1; 360/125.11; 360/119.04

(58) Field of Classification Search ............ 360/125.22, 360/125.24, 125.06, 125.08, 125.21, 125.1, 360/125.56, 125.2, 125.11, 119.04, 125.12, 360/125.26

See application file for complete search history.

(56) References Cited

U.S. PATENT DOCUMENTS

| 2002/0105757 | A1* | 8/2002 | Oki et al. ................... 360/126 |
| 2005/0068676 | A1* | 3/2005 | Lille et al. .................. 360/126 |
| 2006/0044677 | A1* | 3/2006 | Li et al. ...................... 360/122 |
| 2006/0098338 | A1* | 5/2006 | Watabe et al. .............. 360/126 |
| 2008/0218909 | A1* | 9/2008 | Kurihara et al. ............ 360/319 |
| 2008/0239568 | A1* | 10/2008 | Miyatake et al. ....... 360/119.03 |
| 2008/0304179 | A1* | 12/2008 | Miyatake et al. ....... 360/123.02 |

FOREIGN PATENT DOCUMENTS

| JP | 2004234830 | 8/2004 |
| JP | 2005-122831 | 5/2005 |

OTHER PUBLICATIONS

Office Action issued in corresponding Japanese Patent Application No. P2005-27558, dispatched on Mar. 11, 2008.

* cited by examiner

*Primary Examiner*—Jefferson Evans
(74) *Attorney, Agent, or Firm*—Brinks Hofer Gilson & Lione (57) ABSTRACT

A magnetic recording head and a method of manufacturing the magnetic recording head are provided. The perpendicular magnetic recording head includes a main magnetic pole layer and a return path layer that face each other with a gap therebetween in a lamination direction. A non-magnetic insulating layer is interposed between the main magnetic pole layer and the return path layer. At least one stepped portion is formed on a facing surface of at least one of the main magnetic pole layer and the return path layer.

11 Claims, 5 Drawing Sheets

PERPENDICULAR MAGNETIC RECORDING HEAD HAVING A STEPPED PORTION AND METHOD OF MANUFACTURING THE SAME

This application claims the benefit of Japanese Patent Application No. 2005-275558 filed on Sep. 22, 2005, which is hereby incorporated by reference.

BACKGROUND

1. Field

The present embodiments relate to a perpendicular magnetic recording head and a method of manufacturing the perpendicular magnetic recording head.

2. Related Art

Generally, a magnetic head device includes a longitudinal recording (in-plane recording) magnetic head device that applies a magnetic field parallel to a recording medium thereto to perform a recording operation, and a perpendicular magnetic recording head device that applies a magnetic field perpendicular to a recording medium thereto to perform a recording operation. The perpendicular magnetic recording head device is further suitable to increase the recording density.

As commonly known, the perpendicular magnetic recording head has a structure in which a main magnetic pole layer and a return path layer are laminated with a non-magnetic insulating layer therebetween at a surface facing a recording medium. The main magnetic pole layer and the return path layer are magnetically connected to each other at the rear of a surface facing a recording medium (hereinafter, referred to as a medium facing surface) in a height direction. Coil layers for applying a recording magnetic field to the main magnetic pole layer and the return path layer are provided in the non-magnetic insulating layer.

When current is supplied to the coil layers, a recording magnetic field is induced between the main magnetic pole layer and the return path layer. In this case, the recording magnetic field is perpendicularly applied to a hard film of the recording medium from the front end surface of the main magnetic pole layer exposed to the medium facing surface, and the recording magnetic field returns to the return path layer through a soft layer of the recording medium. As a result, a magnetic recording is performed at a portion facing the main magnetic pole layer. The above-mentioned perpendicular magnetic recording head is disclosed in JP-A-2005-122831.

A so-called shielded pole structure has been proposed in recent years. In the shielded pole structure, a distance (gap) between the main magnetic pole layer and the return path layer is small, for example, about 50 nm on the surface facing the recording medium to obtain a magnetic recording head that suppresses the dispersion of the magnetic flux from the main magnetic pole layer toward the return path layer so as to have little blur.

In the perpendicular magnetic recording head having the shielded pole structure, the depth of the return path layer in a depth direction (throat height), as well as the gap, are important parameters used to control the recording magnetic field (control an intensity and gradient of the recording magnetic field), and need to be appropriately adjusted.

When the throat height is small, as in the related art, an area of the main magnetic pole layer facing the return path layer decreases. Accordingly, since the magnetic flux from the main magnetic pole layer toward the return path layer is likely to leak, the intensity of the recording magnetic field increases. However, since the magnetic flux returning from the main magnetic pole layer toward the return path layer is likely to be dispersed, it is difficult to sufficiently increase the gradient of the magnetic field.

Alternatively, when the throat height is large, an area of the main magnetic pole layer facing the return path layer increases. Accordingly, since the magnetic flux is likely to flow from the main magnetic pole layer toward the return path layer, the gradient of the magnetic field is improved. However, since the magnetic flux from the main magnetic pole layer toward the return path layer decreases, the gradient of the magnetic field decreases. As the intensity of the recording magnetic field increases, the gradient of the recording magnetic field decreases. When the gradient of the recording magnetic field increases, the intensity of the recording magnetic field decreases. Therefore, it is not possible to improve the intensity and the gradient of the recording magnetic field at the same time.

SUMMARY

The present embodiments provide a perpendicular magnetic recording head capable of improving a gradient and an intensity of a recording magnetic field, and a method of manufacturing the perpendicular magnetic recording head.

The embodiments have been designed using the fact that the magnetic flux from the main magnetic pole layer toward the return path layer does not decrease in the extreme when a gap between a main magnetic pole layer and a return path layer is small and is large at the rear in a height direction.

According to one exemplary embodiment, a perpendicular magnetic recording head includes a main magnetic pole layer and a return path layer that face each other with a gap therebetween in a lamination direction. A non-magnetic insulating layer is interposed between the main magnetic pole layer and the return path layer. At least one stepped portions is formed on a facing surface of at least one of the main magnetic pole layer and the return path layer. The stepped portions are formed such that a gap between the main magnetic pole layer and the return path layer at the rear in a height direction is larger than that at a position near a front end surface exposed to a surface facing a recording medium.

The return path layer may be provided with one stepped portion, and the return path layer may include a first throat portion that is formed by the stepped portion and faces the main magnetic pole layer on the front end surface exposed to the surface facing the recording medium with a first gap therebetween. A second throat portion extends closer to the rear side in the height direction than the first throat portion and faces the main magnetic pole layer with a second gap larger than the first gap therebetween.

When a thickness and a maximum depth of the return path layer are defined as tR2 and Th2, respectively, the following conditional expression (1) may be satisfied.

$$tR2 < Th2 \qquad (1)$$

When the conditional expression (1) is satisfied, the thickness of the return path layer exposed to a surface facing a recording medium is substantially equal to the thickness of the return path layer. When the thickness of the return path layer exposed to a surface facing a recording medium decreases, it is possible to further suppress the dispersion of the magnetic flux returning to the return path layer.

In another embodiment, a method of manufacturing a perpendicular magnetic recording head includes forming a main magnetic pole layer made of a magnetic material, forming a non-magnetic insulating layer on the main magnetic pole layer, forming one or more stepped portions on an upper surface of the non-magnetic insulating layer so that a thickness of the non-magnetic insulating layer at the rear in a height direction is larger than a thickness of the non-magnetic insulating layer at a front end surface exposed to a surface facing a recording medium, and forming a return path layer made of a magnetic material on the non-magnetic insulating layer including the one or more stepped portions.

In another embodiment, a method of manufacturing a perpendicular magnetic recording head includes forming a main magnetic pole layer made of a magnetic material, forming one or more stepped portions on an upper surface of the main magnetic pole layer so that a thickness of the main magnetic pole layer at the rear in a height direction is smaller than a thickness of the main magnetic pole layer at a front end surface exposed to a surface facing a recording medium, forming a non-magnetic insulating layer on the main magnetic pole layer including the one or more stepped portions so that the stepped portions are buried in the non-magnetic insulating layer and a surface of the non-magnetic insulating layer is planarized, and forming a return path layer made of a magnetic material on the planarized non-magnetic insulating layer.

In another embodiment, a method of manufacturing a perpendicular magnetic recording head includes forming a main magnetic pole layer made of a magnetic material, forming one or more stepped portions on an upper surface of the main magnetic pole layer so that a thickness of the main magnetic pole layer at the rear in a height direction is smaller than a thickness of the main magnetic pole layer at a front end surface exposed to a surface facing a recording medium, forming a non-magnetic insulating layer on the main magnetic pole layer including the one or more stepped portions, forming one or more stepped portions on an upper surface of the non-magnetic insulating layer so that a thickness of the non-magnetic insulating layer at the rear in a height direction is larger than a thickness of the non-magnetic insulating layer at a front end surface exposed to a surface facing a recording medium, and forming a return path layer made of a magnetic material on the non-magnetic insulating layer including the one or more stepped portions.

One stepped portion may be formed on an upper surface of the non-magnetic insulating layer, and the return path layer may include a first throat portion that faces the main magnetic pole layer on the front end surface exposed to the surface facing the recording medium with a first gap therebetween, and a second throat portion that extends closer to the rear side in the height direction than the first throat portion and faces the main magnetic pole layer with a second gap larger than the first gap therebetween.

When a plating thickness and a maximum depth of the return path layer are defined as tR2 and Th2, respectively, the following conditional expression (1) may be satisfied.

$$tR2 < Th2 \tag{1}$$

According to present embodiments, a gap between a main magnetic pole layer and a return path layer is set to be small at a position close to a surface facing a recording medium, and is set to be large at the rear in a height direction. Therefore, it is possible to obtain a perpendicular magnetic recording head capable of improving a gradient and an intensity of a recording magnetic field, and a method of manufacturing the perpendicular magnetic recording head.

DESCRIPTION OF THE PREFERRED EMBODIMENT

Figure 1:
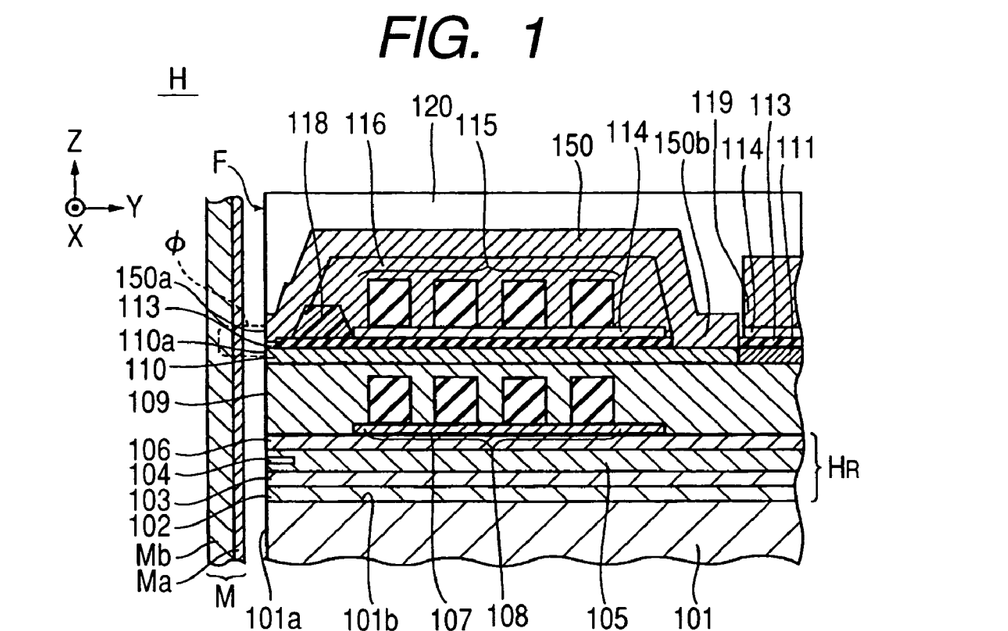
FIG. 1 is a longitudinal cross-sectional view partially showing an entire configuration of a perpendicular magnetic recording head according to a first embodiment.
Figure 2:
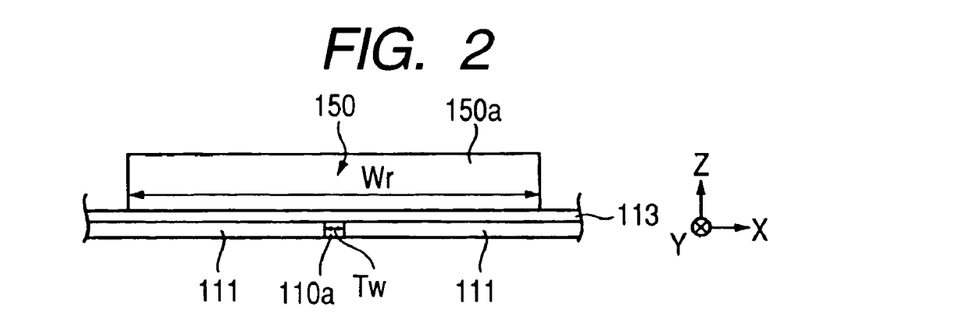
FIG. 2 is a front view partially showing the perpendicular magnetic recording head.
Figure 3:
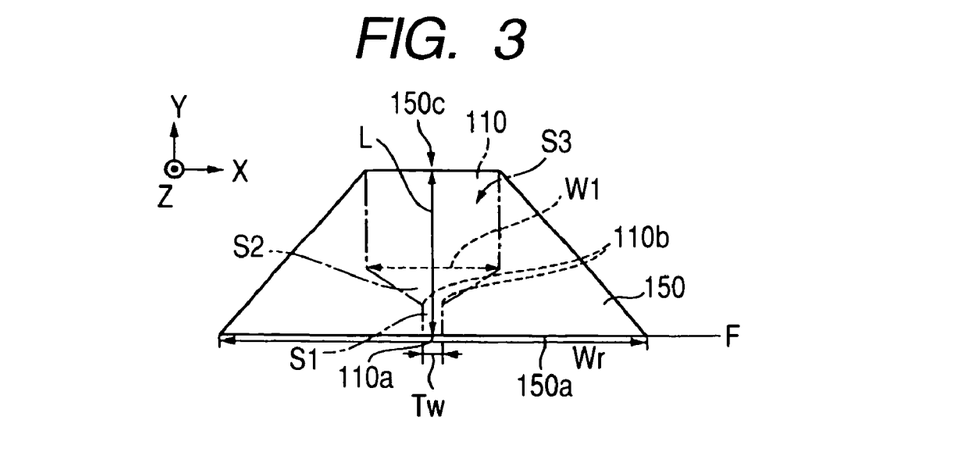
FIG. 3 is a plan view partially showing the perpendicular magnetic recording head.

FIG. 1 is a longitudinal cross-sectional view partially showing an entire configuration of a perpendicular magnetic recording head according to a first embodiment. FIG. 2 is a front view partially showing the perpendicular magnetic recording head, and FIG. 3 is a plan view partially showing the perpendicular magnetic recording head. In FIGS. 1 to 3, an X direction, a Y direction, and a Z direction are defined as a track width direction, a height direction, and a direction where a recording medium M moves, respectively.

A perpendicular magnetic recording head H applies a perpendicular magnetic field to the recording medium M so that a hard film Ma of the recording medium M is magnetized in a direction perpendicular to the hard film. The recording medium M includes the hard film Ma and a soft film Mb. The hard film Ma has a high residual magnetization and is provided close to the surface of the recording medium M, and the soft film Mb has a high magnetic transmittance and is provided at an inner portion of the recording medium M than the hard film Ma. For example, the recording medium M has a disc shape, and rotates about a central axis thereof.

A slider 101 is formed of a non-magnetic material such as $Al_2O_3$ and TiC, and a surface 101a of the slider 101 faces the recording medium M. If the recording medium M rotates, the slider 101 floats at a distance from the surface of the recording medium M by airflow along the surface thereof or slides thereon.

A non-magnetic insulating layer 102 made of an inorganic material, for example $Al_2O_3$ or $SiO_2$, and is formed on a side end surface 101b of the slider 101 at a trailing portion, and a reading part $H_R$ is formed on the non-magnetic insulating layer 102.

The reading part $H_R$ includes a lower shield layer 103, an upper shield layer 106, an inorganic insulating layer (gap insulating layer) 105 provided between the lower shield layer 103 and the upper shield layer 106, and a reading element 104 provided in the inorganic insulating layer 105. The reading element 104 is a magnetoresistive effect element, for example, AMR, GMR, or TMR.

A plurality of first coil layers 108 made of a conductive material is formed on the upper shield layer 106 with a coil insulating underlayer 107 provided therebetween. Each of the first coil layers 108 is formed, for example, of at least one non-magnetic metal material selected from a group consisting of Au, Ag, Pt, Cu, Cr, Al, Ti, NiP, Mo, Pd, and Rh. Alternatively, each of the first coil layers may have a laminate structure where the above-mentioned non-magnetic metal materials are laminated. A coil insulating layer 109, which is made of an inorganic insulating material such as $Al_2O_3$ or an organic insulating material such as resist, is formed around the first coil layers 108.

An upper surface of the coil insulating layer 109 is planarized, and a plating underlayer (not shown) is formed on the planarized surface. A main magnetic pole layer 110 is formed on the plating underlayer.

As shown in FIG. 3, the main magnetic pole layer 110 has a predetermined length L from a surface F of the perpendicular magnetic recording head facing the recording medium (hereinafter, simply referred to as a medium facing surface F) in the height direction, and a width of a front end surface 110a, which is exposed to the medium facing surface F, in the track width direction is defined as a track width Tw. The main magnetic pole layer 110 is formed of, for example, a ferromagnetic material having a high saturation magnetic flux density, such as Ni—Fe, Co—Fe, or Ni—Fe—Co.

As shown in FIG. 3, the main magnetic pole layer 110 includes a front portion S1, an inclined portion S2, and a rear portion S3. A length of the front portion S1 including the front end surface 110a in the track width direction is defined as the track width Tw. The inclined portion S2 extends from a base portion 110b of the front portion S1 in the height direction so that a width W1 of the inclined portion S2 in the track width direction is larger than the track width Tw. The track width Tw is in the range of about 0.05 to 0.20 μm, and a length of the front portion S1 in the height direction is in the range of about 0.01 to 0.20 μm. The rear portion S3 is a portion where the width W1 in the track width direction is largest, and the width W1 of the rear portion is in the range of about 5 to 50 μm, or lengths of the inclined portion S2 and the rear portion S3 in the height direction are in the range of about 5 to 20 μm.

A first insulating material layer 111 are formed on both sides of the main magnetic pole layer 110 in the track width direction at the rear of the main magnetic pole layer in the height direction. The first insulating material layer 111 can be formed of, for example, $Al_2O_3$, $SiO_2$, or Al—Si—O. A gap layer 113 made of a non-magnetic inorganic insulating material, such as $Al_2O_3$ or $SiO_2$, is formed on the main magnetic pole layer 110 and the first insulating material layer 111. Second coil layers 115 are formed on the gap layer 113 with a coil insulating underlayer 114 provided therebetween. Like the first coil layers 108, a plurality of the second coil layer 115 are formed of a conductive material. Each of the second coil layers 115 are formed, for example, of at least one non-magnetic metal material selected from a group consisting of Au, Ag, Pt, Cu, Cr, Al, Ti, NiP, Mo, Pd, and Rh. Alternatively, each of the second coil layers may have a laminate structure where the above-mentioned non-magnetic metal materials are laminated.

Ends of each of the first coil layers 108 and the second coil layers 115 in the track width direction (X direction in the drawings) are electrically connected to each other so as to form a toroidal shape. The shapes of the coil layers (magnetic field generator) are not limited to the toroidal shape.

A coil insulating layer 116, which is made of an organic insulating material such as a resist, is formed around the second coil layers 115. A return path layer 150 made of a ferromagnetic material such as Permalloy is formed by plating over the coil insulating layer 116 and the gap layer 113. The return path layer 150 includes a front end surface 150a exposed to the medium facing surface F, and a connecting portion 150b connected to the main magnetic pole layer 110 on the rear side in the height direction.

A throat height determining layer (second throat height determining layer) 118 made of an inorganic or organic material is formed at a position, which is spaced from the medium facing surface F by a predetermined distance, on the gap layer 113. The largest depth of the return path layer 150 (second throat height Th2) is determined by a distance between the medium facing surface F and the throat height determining layer 118.

A lead layer 119 that extends from the second coil layers 115 is provided on the gap layer on the rear side of the return path layer 150 in the height direction, with the coil insulating underlayer 114 provided between the lead layer 119 and the gap layer. The return path layer 150 and the lead layer 119 are covered with a protective layer 120 made of an inorganic non-magnetic insulating material or the like.

As shown in FIG. 2, the width Tw in the track width direction (X direction in the drawings) of the front end surface 110a of the main magnetic pole layer 110 is sufficiently smaller than a width Wr in the track width direction of the front end surface 150a of the return path layer 150. For example, on the medium facing surface F, the area of the front end surface 110a of the main magnetic pole layer 110 is sufficiently smaller than that of the front end surface 150a of the return path layer 150. Accordingly, a magnetic flux Φ of a leakage recording magnetic field is concentrated on the front end surface 110a of the main magnetic pole layer 110, and the hard film Ma of the recording medium M is magnetized in a direction perpendicular to the hard film by the concentrated magnetic flux Φ so that magnetic data are recorded thereon.

Figure 4:
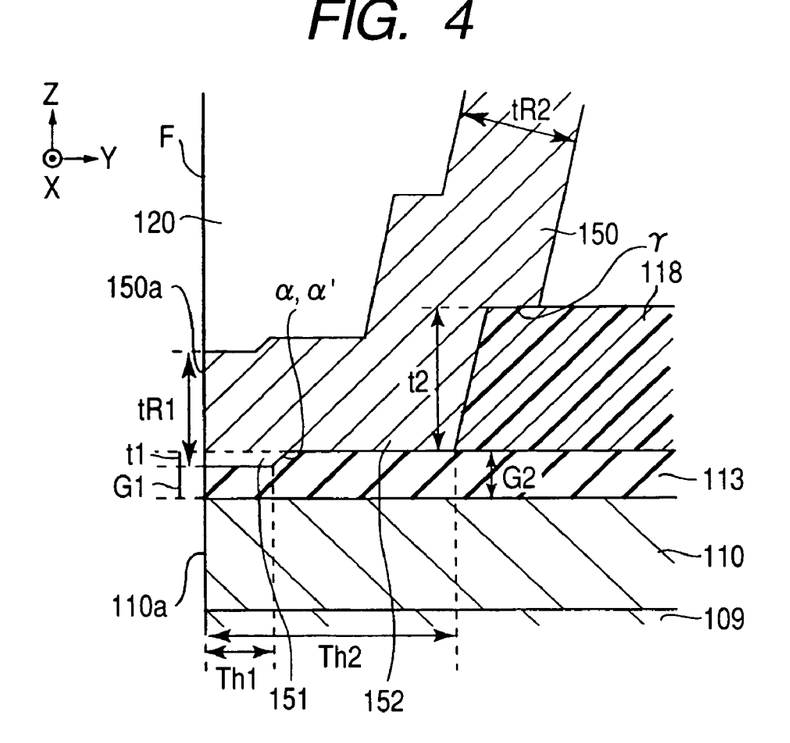
FIG. 4 is an enlarged cross-sectional view showing a recording part near a facing surface of the perpendicular magnetic recording head.

As shown in FIG. 4, in a present embodiment, the return path layer 150 is provided with one stepped portion α so that the distance (gap) between the return path layer 150 and the main magnetic pole layer 110 at the rear in the height direction is larger than that at a position close to the medium facing surface F (front end surfaces 150a and 110a). The main magnetic pole layer 110 is formed on the planarized coil insulating layer 109 to have a constant thickness, and a surface (upper surface) of the main magnetic pole layer 110 facing the return path layer 150 is planarized.

The return path layer 150 is an alloy film that is formed by plating and is formed of, for example, a ferromagnetic material having a high saturation magnetic flux density, such as Ni—Fe, Co—Fe, or Ni—Fe—Co. The plating thickness tR2 of the return path layer 150 is substantially equal to the thickness tR1 of the return path layer 150 exposed to the front end surface 150a. Specifically, the thickness tR1 is equal to or larger than the plating thickness tR2, and is equal to or smaller than twice as large as the plating thickness tR2 (tR2≦tR1≦2·tR2). The plating thickness tR2 of the return path layer 150 is about 0.3 μm.

The return path layer 150 includes a first throat portion 151 and a second throat portion 152. The first throat portion 151 is formed by the stepped portion α formed on the surface of the return path layer facing the main magnetic pole layer 110, and faces the main magnetic pole layer 110 on the front end surface 150a with a first gap G1 therebetween. The second throat portion 152 faces the main magnetic pole layer 110 with a second gap G2 therebetween. The second gap G2 is larger than the first gap G1 (G2>G1). For example, the throat portions of the return path layer 150 have a two-step shape. When the throat portions of the return path layer 150 have a two-step shape, since the first gap G1 at a position close to the medium facing surface F (front end surfaces 110a and 150a) is set to be small, it is possible to suppress the dispersion of the magnetic flux from the main magnetic pole layer 110 toward the return path layer 150. Therefore, it is possible to improve the gradient of the recording magnetic field. If the second gap G2 at the rear in the height direction is large, it is possible to maintain the intensity of the recording magnetic field high without reducing the magnetic flux from the main magnetic pole layer 110 toward the recording medium M, even though the depth (second throat height) of the return path layer 150 is large. In the first embodiment, the first gap G1 is about 50 nm, and the second gap G2 is about 100 nm.

The thickness and depth of the first throat portion 151 are determined in the return path layer 150 by the depth and the position of the stepped portion α. The second throat portion 152 extends closer to the rear side in the height direction than the first throat portion 151. The depth of the second throat portion 152 (the distance in the height direction between the front end surface 150a and the rear end surface coming in contact with the throat height determining layer 118) is larger than the depth of the first throat portion 151 (the distance in the height direction between the front end surface 150a and the rear end surface coming in contact with the stepped portion α). In the first embodiment, the depth of the first throat portion 151 is represented by a first throat height Th1, and the depth of the second throat portion 152 is represented by a second throat height Th2 (Th1<Th2). Specifically, the first throat height Th1 is about 0.1 μm, and the second throat height Th2 is about 0.4 μm. The largest depth of the return path layer 150 is the second throat height Th2.

A step height (the depth of the stepped portion α) t1 determining the first throat portion 151 and the first throat height Th1 is smaller than a step height (the thickness of the throat height determining layer 118) t2 determining the second throat portion 152 and the second throat height Th2 (t1<t2). In the first embodiment, the step height t1 is about 50 nm, and the step height t2 is about 400 nm.

A conditional expression (1) tR2<Th2 may be satisfied between the second throat height Th2 and the plating thickness tR2 of the return path layer 150. Since the conditional expression (1) is satisfied, the thickness tR1 of the return path layer 150 exposed to the front end surface 150a thereof can be substantially equal to the plating thickness tR2 of the return path layer 150. If the thickness tR1 of the return path layer 150 exposed to the front end surface 150a thereof is small, it is possible to further suppress the dispersion of the magnetic flux returning to the return path layer 150. Therefore, it is possible to improve the gradient of the recording magnetic field. In the first embodiment, the above-mentioned second throat height Th2 is about 0.4 μm, and the plating thickness tR2 of the return path layer 150 is about 0.3 μm. Accordingly, the conditional expression (1) is satisfied.

A method of the perpendicular magnetic recording head shown in FIGS. 1 to 4 will be described below. A method of manufacturing the main magnetic pole layer 110, the gap layer 113, and the return path layer 150 will be described. Since the other layers are formed using common procedures, the descriptions thereof will be omitted.

First, the plating underlayer is formed on the coil insulating layer 109 covering the first coil layers 108 and the surrounding portions, and the main magnetic pole layer 110 is formed on the plating underlayer by the art of plating. The upper surface of the coil insulating layer 109 is planarized. The main magnetic pole layer 110 is formed of a ferromagnetic material having a high saturation magnetic flux density, such as Ni—Fe, Co—Fe, or Ni—Fe—Co. The main magnetic pole layer 110 is planarized.

The gap layer 113 made of a non-magnetic inorganic insulating material, such as $Al_2O_3$ or $SiO_2$, is formed on the main magnetic pole layer 110 to have a constant thickness. The thickness of the gap layer 113 during the formation thereof defines the first gap G1. A stepped portion α' is formed on the gap layer 113 at the position where a desired first throat height Th1 is obtained so that the thickness of the gap layer 113 at a position close to an end surface serving as the medium facing surface F is smaller than that at the rear in the height direction. The thickness of the gap layer 113 at the stepped portion α' defines the second gap G2.

Alternatively, the gap layer 113 is formed to have a constant thickness corresponding to a desired second gap G2, and the gap layer 113 is etched between the end surface serving as the medium facing surface F and the position where a desired first throat height Th1 is obtained so as to have a constant thickness corresponding to a desired first gap G1, whereby the stepped portion α' may be formed.

The throat height determining layer 118 made of an organic insulating material such as resist is formed on the gap layer 113 at a position where a desired first throat height Th2 is obtained.

The plating underlayer is formed on the upper surface of the gap layer 113 that includes the stepped portion α and the throat height determining layer 118, and the return path layer 150 is formed on the plating underlayer by the art of plating. The return path layer 150 is formed of a ferromagnetic material having a high saturation magnetic flux density, such as Ni—Fe, Co—Fe, or Ni—Fe—Co, to have a constant plating thickness tR2. The stepped portion α, which reflects the shape of the upper surface of the gap layer 113 and corresponds to the stepped portion α' of the gap layer 113, is formed on a surface of the return path layer 150 facing the main magnetic pole layer 110. Since the stepped portion α is formed the return path layer 150, the return path layer 150 has a two-step shape that includes the first throat portion 151 and the second throat portion 152. The first throat portion 151 faces the main magnetic pole layer 110 with the first gap G1 therebetween. The second throat portion 152 extends closer to the rear side in the height direction than the first throat portion 151, and faces the main magnetic pole layer 110 with the second gap G2 therebetween. The second throat height Th2 is larger than the plating thickness tR2 of the return path layer 150.

In the first embodiment, the step height (the thickness of the throat height determining layer 118) t2 determining the second throat height Th2 is sufficiently larger than the step height (the depth of the stepped portion α) t1 determining the first throat height Th1. A stepped portion γ formed on the throat height determining layer 118 at the rear in the height direction has no effect on the control of the recording magnetic field.

After the return path layer 150 is formed and the protective layer 120 covering the return path layer 150 is formed, the end surface of the head is mechanically grinded to form the medium facing surface F. Since the plating thickness tR2 of the return path layer 150 is set to be smaller than the second throat height Th2, the thickness tR1 of the return path layer 150 exposed to the medium facing surface F is substantially equal to the plating thickness tR2, more specifically, the thickness tR1 satisfies the condition $tR2 \leq tR1 \leq 2 \cdot tR2$.

Therefore, the perpendicular magnetic recording head, shown in FIGS. 1 to 4, according to the first embodiment is obtained.

Figure 5:
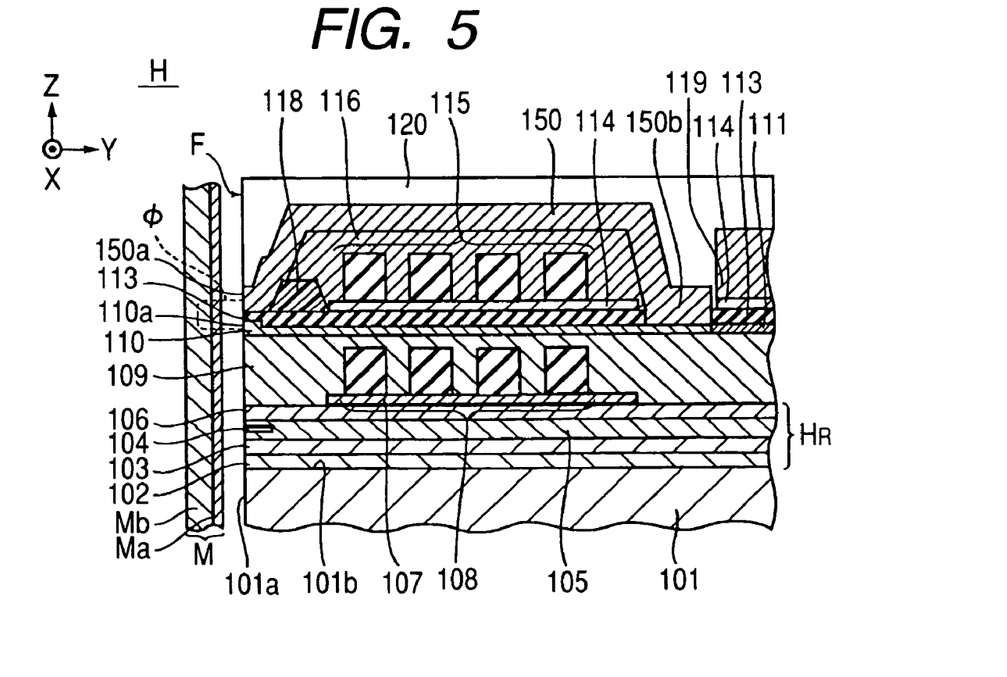
FIG. 5 is a longitudinal cross-sectional view partially showing an entire configuration of a perpendicular magnetic recording head according to a second embodiment.
Figure 6:
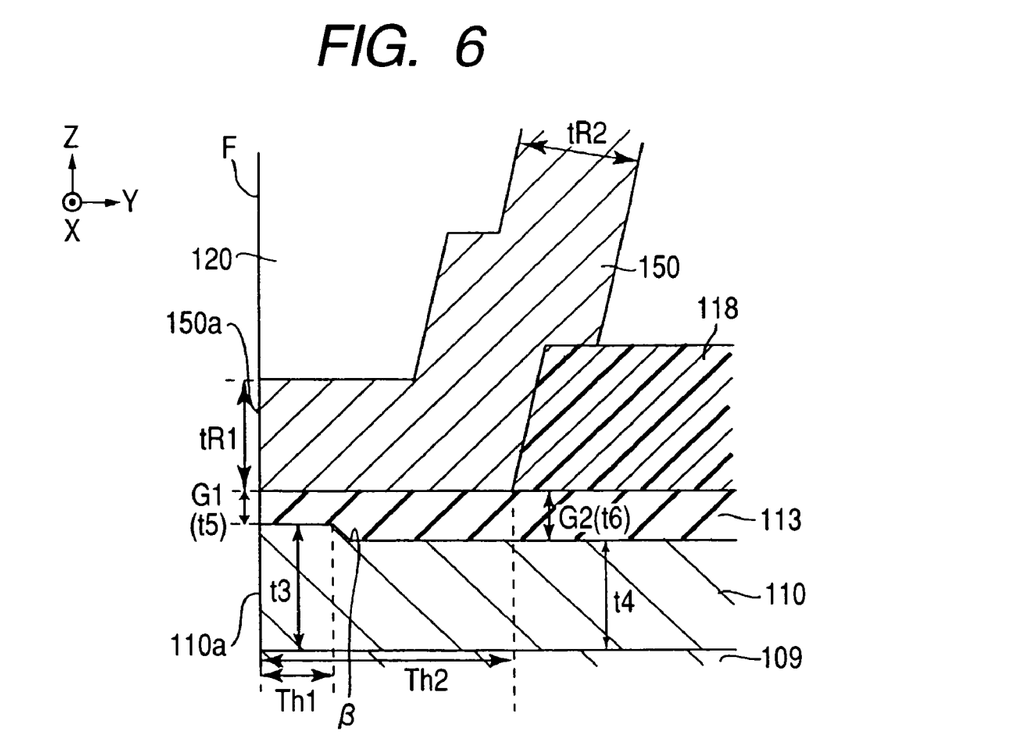
FIG. 6 is an enlarged cross-sectional view showing a recording part near a facing surface of the perpendicular magnetic recording head shown in FIG. 5.

FIGS. 5 and 6 show a perpendicular magnetic recording head according to a second embodiment. FIG. 5 is a longitudinal cross-sectional view partially showing the entire configuration of the perpendicular magnetic recording head, and FIG. 6 is an enlarged cross-sectional view showing a recording part (a main magnetic pole layer 110, a gap layer 113, and a return path layer 150) near a medium facing surface F.

According to the second embodiment, the main magnetic pole layer 110 is provided with a stepped portion so that the distance (gap) between the main magnetic pole layer 110 and the return path layer 150 at the rear in the height direction is larger than that at a position close to the medium facing surface F. The second embodiment has the same configuration as the first embodiment except for the main magnetic pole layer 110, the gap layer 113, and the return path layer 150. In FIGS. 5 and 6, elements having the same functions as those of the first embodiment have the same reference numerals as those in FIGS. 1 to 4.

Since a stepped portion β is formed on the surface of the main magnetic pole layer 110 facing the return path layer 150, the thickness t4 of the main magnetic pole layer 110 at the rear in the height direction is smaller than the thickness t3 of the main magnetic pole layer at a position close to the front end surface 110a thereof (t2>t1). The main magnetic pole layer 110 is formed by the art of plating on the plating underlayer, which is formed on the coil insulating layer 109, and is etched so that the portion of the main magnetic pole layer spaced from the front end surface 110a by a predetermined distance at the rear in the height direction has a thickness t4. Accordingly, the stepped portion β is formed. The main magnetic pole layer 110 is planarized so that the portion of the main magnetic pole layer close to the front end surface 110a is finished to have a thickness t3.

Alternatively, the main magnetic pole layer 110 is formed by plating on the plating underlayer, which is formed on the coil insulating layer 109, and is planarized to have a thickness t3. Subsequently, the main magnetic pole layer 110 is cut to have a thickness t4, thereby forming the stepped portion β is formed. In the second embodiment, the depth from the front end surface 110a of the main magnetic pole layer 110 to the stepped portion β is represented as a first throat height Th1. The first throat height Th1 is about 0.1 μm.

The gap layer 113 is formed on the upper surface of the main magnetic pole layer 110 having the stepped portion β so that the stepped portion β is buried in the gap layer 113. The upper surface of the gap layer 113 is planarized, and the thickness t6 of the gap layer 113 at the rear in the height direction is larger than the thickness t5 thereof at a position close to the medium facing surface F. The thickness t5 of the gap layer 113 at a position close to the medium facing surface F corresponds to a first gap G1, and the thickness t6 of the gap layer 113 at the rear in the height direction corresponds to a second gap G2. In the second embodiment, the first gap G1 is about 50 nm, and the second gap G2 is about 100 nm.

The return path layer 150 is formed by the art of plating on the plating underlayer, which is formed on the planarized gap layer 113, so as to have a constant plating thickness tR2. The depth of the return path layer 150 is determined by the throat height determining layer 118. In the second embodiment, the depth of the return path layer 150 (the distance in the height direction between the front end surface 150a and the rear end surface coming in contact with the throat height determining layer 118) is represented as a second throat height Th2. Specifically, the second throat height Th2 is about 0.4 μm, and is larger than the first throat height Th1. Since the second throat height Th2 is larger than the plating thickness tR2, the thickness tR1 of the return path layer 150 exposed to the front end surface 110a is substantially equal to the plating thickness tR2 as described in the first embodiment.

In the second embodiment, since the first gap G1 at a position close to the medium facing surface F (the front end surfaces 110a and 150a) is small, it is possible to suppress the dispersion of the magnetic flux from the main magnetic pole layer 110 toward the return path layer 150. It is possible to improve the gradient of the recording magnetic field. If the second gap G2 at the rear in the height direction is large, it is possible to maintain the intensity of the recording magnetic field high without reducing the magnetic flux from the main magnetic pole layer 110 toward the recording medium M, even though the depth (second throat height Th2) of the return path layer 150 is set to be large.

Figure 7:
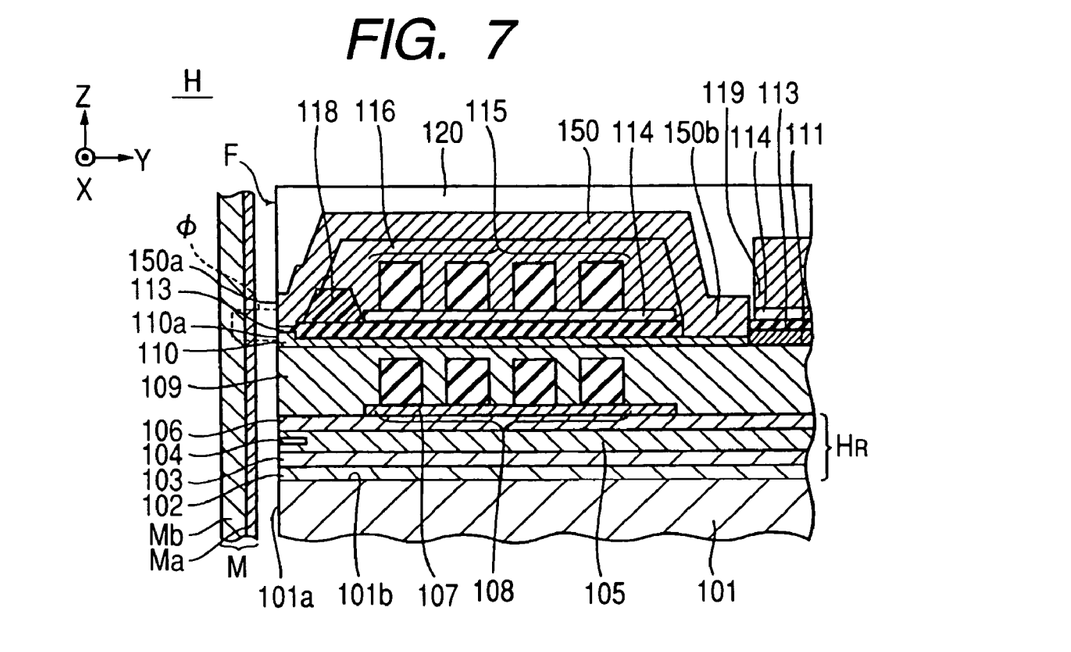
FIG. 7 is a longitudinal cross-sectional view partially showing an entire configuration of a perpendicular magnetic recording head according to a third embodiment.
Figure 8:
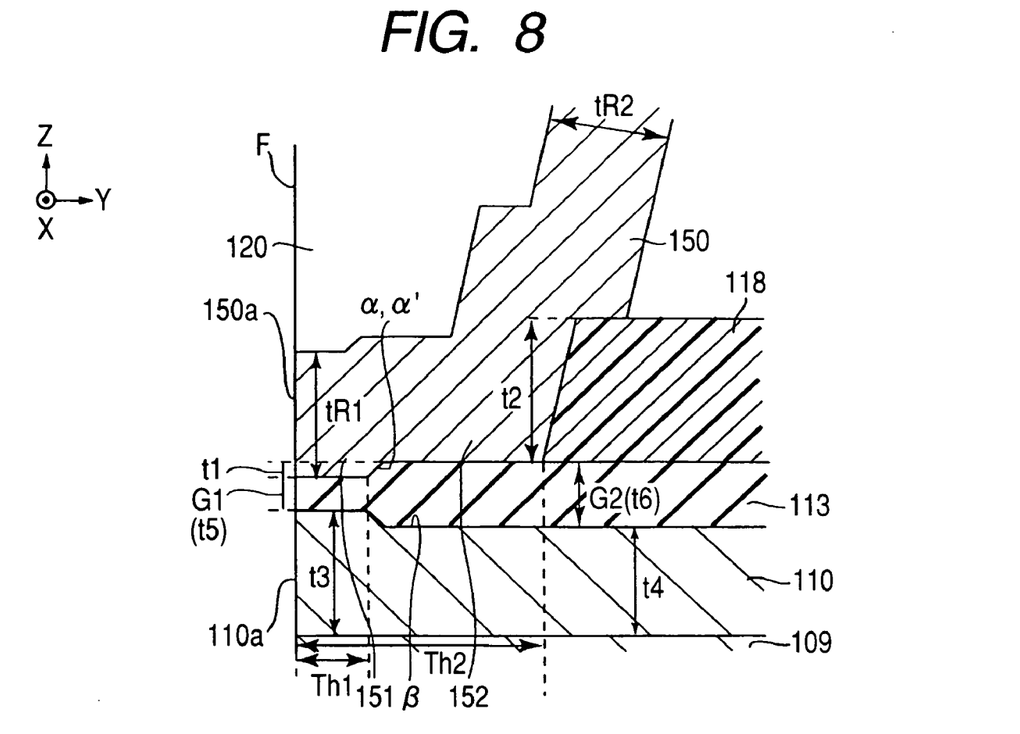
FIG. 8 is an enlarged cross-sectional view showing a recording part near a facing surface of the perpendicular magnetic recording head shown in FIG. 7.

FIGS. 7 and 8 show a perpendicular magnetic recording head according to a third embodiment. FIG. 7 is a longitudinal cross-sectional view partially showing the entire configuration of the perpendicular magnetic recording head, and FIG. 8 is an enlarged cross-sectional view showing a recording part (a main magnetic pole layer 110, a gap layer 113, and a return path layer 150) near a front end surface. According to the third embodiment, the main magnetic pole layer 110 and the return path layer 150 are provided with a stepped portion so that the distance (gap) between the main magnetic pole layer 110 and the return path layer 150 at the rear in the height direction is larger than that at a position close to the medium facing surface F. For example, the return path layer 150 has the stepped portion α of the first embodiment and the main magnetic pole layer 110 having the stepped portion β of the first embodiment are combined with each other. In FIGS. 7 and 8, elements having the same functions as those of the first and the second embodiments have the same reference numerals as those in FIGS. 1 to 6.

The shape of the return path layer 150 having the stepped portion α is similar to that of the return path layer according to the first embodiment, and the shape of the main magnetic pole layer 110 having the stepped portion β is similar to that of the main magnetic pole layer according to the second embodiment.

The gap layer 113 is formed on the upper surface of the main magnetic pole layer 110 having the stepped portion β so that the stepped portion β is buried in the gap layer 113. A stepped portion α' is formed on the upper surface of the gap layer 113 so that the thickness of the gap layer 113 at the rear in the height direction is larger than the thickness thereof at a position close to the medium facing surface F. The stepped portion α' and the stepped portion β formed on the main magnetic pole layer 110 are axisymmetric, and a stepped portion α corresponding to the stepped portion α' is formed on the return path layer 150.

In the third embodiment, the depth from the front end surface 110a of the main magnetic pole layer 110 to the stepped portion β is equal to the depth of the first throat portion 151 of the return path layer 150, and is represented as a first throat height Th1. The depth of the second throat portion 152 of the return path layer 150 is represented as a second throat height Th2. It is possible to appropriately set the position of the stepped portion α', and to set the position of the stepped portion α of the return path layer 150 to be different from that of the stepped portion β of the main magnetic pole layer 110.

The thickness t6 of the gap layer 113 at the rear in the height direction is larger than the thickness t5 thereof at a position close to the medium facing surface F. The thickness t5 of the gap layer 113 at a position close to the medium facing surface F corresponds to a first gap G1, and the thickness t6 of the gap layer 113 at the rear in the height direction corresponds to a second gap G2. In the third embodiment, the first gap G1 is about 50 nm, and the second gap G2 is about 150 nm.

Even in the third embodiment, since the first gap G1 at a position close to the medium facing surface F (the front end surfaces 110a and 150a) is small, it is possible to suppress the dispersion of the magnetic flux from the main magnetic pole layer 110 toward the return path layer 150. Therefore, it is possible to improve the gradient of the recording magnetic field. If the second gap G2 at the rear in the height direction is large, it is possible to maintain the intensity of the recording magnetic field high without reducing the magnetic flux from the main magnetic pole layer 110 toward the recording medium M, even though the maximum depth (second throat height Th2) of the return path layer 150 is large.

Figure 9:
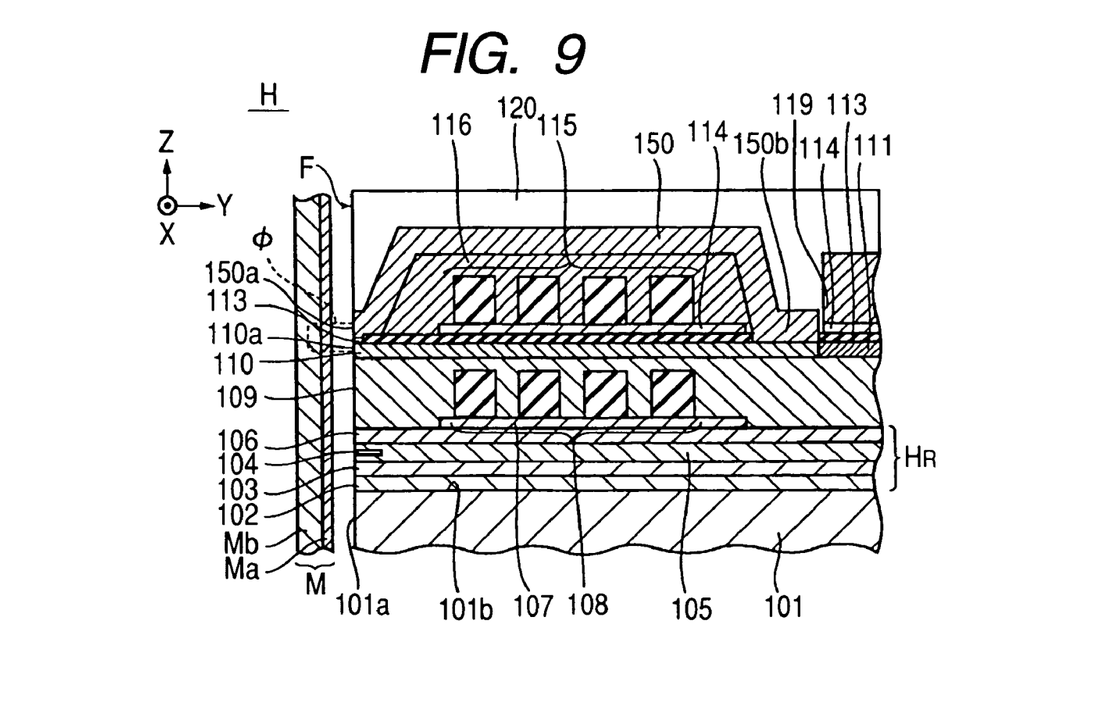
FIG. 9 is a longitudinal cross-sectional view partially showing an entire configuration of a perpendicular magnetic recording head according to a fourth embodiment.
Figure 10:
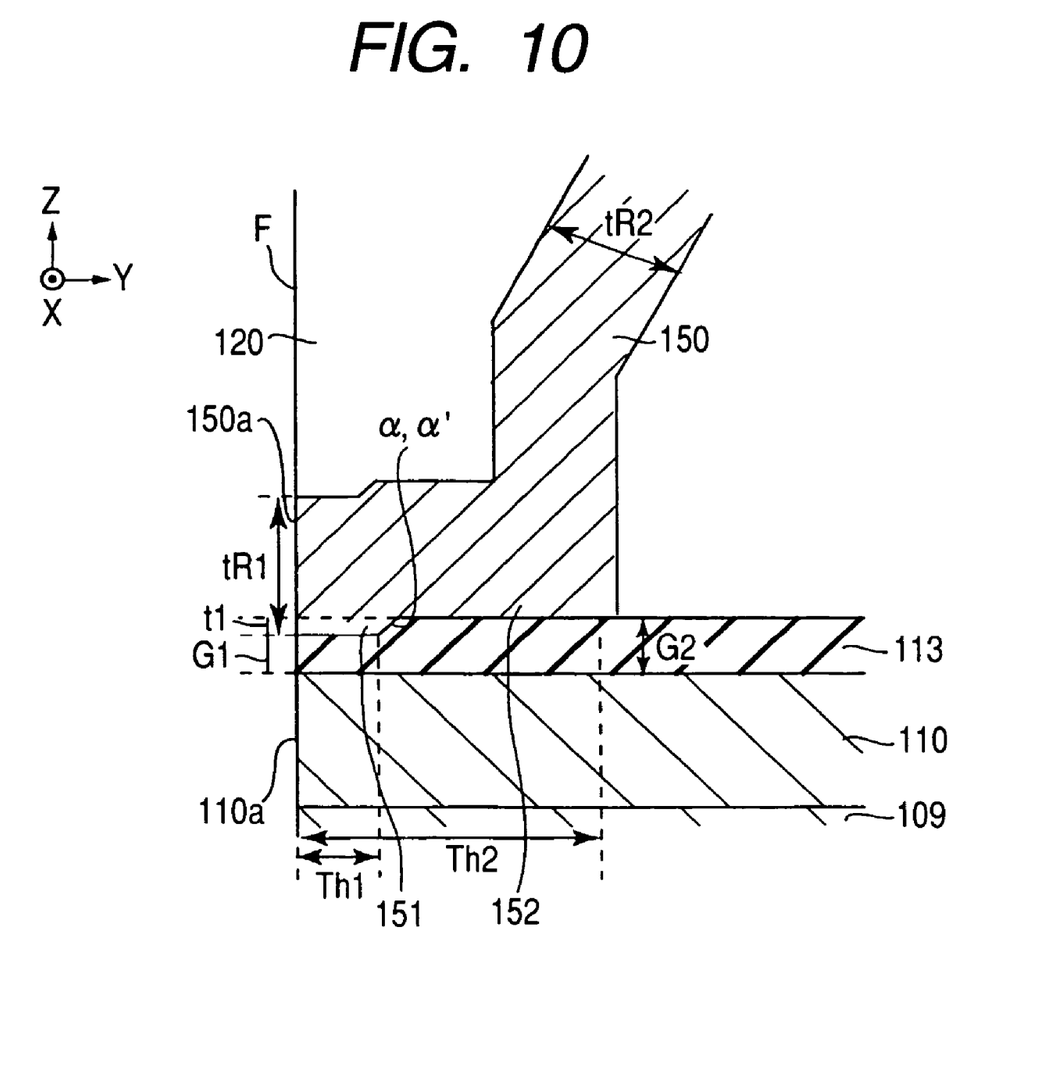
FIG. 10 is an enlarged cross-sectional view showing a recording part near a facing surface of the perpendicular magnetic recording head shown in FIG. 10.

FIGS. 9 and 10 show a perpendicular magnetic recording head according to a fourth embodiment. FIG. 9 is a longitudinal cross-sectional view partially showing the entire configuration of the perpendicular magnetic recording head, and FIG. 10 is an enlarged cross-sectional view showing a recording part (a main magnetic pole layer 110, a gap layer 113, and a return path layer 150) near a front end surface. In the fourth embodiment, the throat height determining layer 118 of the first embodiment is not included and the second throat height Th2 is determined by the coil insulating layer 116 instead of the throat height determining layer 118. The fourth embodiment has the same configuration as the first embodiment except for the presence or absence of the throat height determining layer 118. A stepped portion α is formed on the return path layer 150 so that a gap at the rear in the height direction is larger than that at a position close to the medium facing surface F regardless of the presence or absence of the throat height determining layer 118. Accordingly, it is possible to suppress the dispersion of the magnetic flux from the main magnetic pole layer 110 toward the return path layer 150. As a result, it is possible to improve the gradient of the recording magnetic field, and to maintain the intensity of the recording magnetic field high without reducing the magnetic flux from the main magnetic pole layer 110 toward the recording medium M. In FIGS. 9 and 10, elements having the same functions as those of the first embodiment have the same reference numerals as those in FIGS. 1 to 4.

In the above-mentioned embodiments, one stepped portions α or β is formed on at least one of main magnetic pole layer 110 and the return path layer so that the thickness thereof at the rear in the height direction is larger than the thickness thereof at a position close to the medium facing surface F. However, a plurality of stepped portions α and β may be formed on the layer. If a plurality of stepped portions are formed on the layer, it is possible to precisely control the gradient and intensity of the recording magnetic field.

The thickness tR2 of the return path layer 150, the step heights t1 and t2 determining the first and the second throat portions 151 and 152 of the return path layer, gaps G1 and G2, and the throat heights Th1 and Th2 are not limited to the specific values described in each embodiment, and may be appropriately adjusted so as to obtain a desired gradient and intensity of the recording magnetic field.

Various embodiments described herein can be used alone or in combination with one another. The forgoing detailed description has described only a few of the many possible implementations of the present invention. For this reason, this detailed description is intended by way of illustration, and not by way of limitation. It is only the following claims, including all equivalents that are intended to define the scope of this invention.

What is claimed is:

1. A perpendicular magnetic recording head comprising:
   a main magnetic pole layer and a return path layer that face each other with a gap therebetween in a lamination direction;
   a non-magnetic insulating layer that extends from a surface that faces a recording medium to the rear in a height direction, and is interposed between the main magnetic pole layer and the return path layer; and
   at least one stepped portion that is formed on a facing surface of at least one of the main magnetic pole layer and the return path layer, the at least one stepped portion being formed such that the gap at the rear in a height direction is larger than that at a position close to a front end surface exposed to the surface that faces the recording medium, wherein
   the main magnetic pole layer has a first facing surface and the return path layer has a second facing surface,
   the first facing surface and the second facing surface face each other with only the non-magnetic insulating layer therebetween, and
   the at least one stepped portion is formed on at least one of the first facing surface and the second facing surface.

2. The perpendicular magnetic recording head according to claim 1,
   wherein the return path layer is provided with one stepped portion, and
   the return path layer includes a first throat portion formed by the stepped portion and faces the main magnetic pole layer on the front end surface exposed to the surface that faces the recording medium with a first gap length therebetween, and a second throat portion that extends closer to the rear side in the height direction than the first throat portion and faces the main magnetic pole layer with a second gap length that is larger than the first gap length therebetween.

3. The perpendicular magnetic recording head according to claim 1,
   wherein when a thickness and a maximum depth of the return path layer are defined as tR2 and Th2, respectively, the conditional expression tR2<Th2 is satisfied.

4. A method of manufacturing a perpendicular magnetic recording head, comprising:
   forming a main magnetic pole layer made of a magnetic material;
   forming a non-magnetic insulating layer on the main magnetic pole layer so that the non-magnetic insulating layer extends from a surface that faces a recording medium to the rear in a height direction;
   forming at least one stepped portion on an upper surface of the non-magnetic insulating layer so that a thickness of the non-magnetic insulating layer at the rear in the height direction is larger than a thickness of the non-magnetic insulating layer at a front end surface exposed to the surface that faces the recording medium; and
   forming a return path layer made of a magnetic material on the non-magnetic insulating layer that includes the at least one stepped portion, wherein
   the main magnetic pole layer has a first facing surface and the return path layer has a second facing surface,
   the first facing surface and the second facing surface face each other with only the non-magnetic insulating layer therebetween, and
   the at least one stepped portion is formed on the second facing surface.

5. The method of manufacturing a perpendicular magnetic recording head according to claim 4,
wherein one stepped portion is formed on an upper surface of the non-magnetic insulating layer, and
the return path layer includes a first throat portion that faces the main magnetic pole layer on the front end surface exposed to the surface that faces the recording medium with a first gap length therebetween, and a second throat portion that extends closer to the rear side in the height direction than the first throat portion and faces the main magnetic pole layer with a second gap length larger than the first gap length therebetween.

6. The method of manufacturing a perpendicular magnetic recording head according to claim 4,
wherein when a plating thickness and a maximum depth of the return path layer are defined as tR2 and Th2, respectively, the conditional expression tR2<Th2 is satisfied.

7. A method of manufacturing a perpendicular magnetic recording head, comprising:
forming a main magnetic pole layer made of a magnetic material;
forming at least one stepped portion on an upper surface of the main magnetic pole layer so that a thickness of the main magnetic pole layer at the rear in a height direction is smaller than a thickness of the main magnetic pole layer at a front end surface exposed to a surface that faces a recording medium;
forming a non-magnetic insulating layer on the main magnetic pole layer extends from the surface that faces the recording medium to the rear in a height direction, and that includes the at least one stepped portion so that the stepped portion is buried in the non-magnetic insulating layer and a surface of the non-magnetic insulating layer is planarized; and
forming a return path layer made of a magnetic material on the planarized non-magnetic insulating layer, wherein
the main magnetic pole layer has a first facing surface and the return path layer has a second facing surface,
the first facing surface and the second facing surface face each other with only the non-magnetic insulating layer therebetween, and
the at least one stepped portion is formed on the first facing surface.

8. The method of manufacturing a perpendicular magnetic recording head according to claim 7,
wherein when a plating thickness and a depth of the return path layer are defined as tR2 and Th2, respectively, the conditional expression tR2<Th2 is satisfied.

9. A method of manufacturing a perpendicular magnetic recording head, comprising:
forming a main magnetic pole layer made of a magnetic material;
forming at least one stepped portion on an upper surface of the main magnetic pole layer so that a thickness of the main magnetic pole layer at the rear in a height direction is smaller than a thickness of the main magnetic pole layer at a front end surface exposed to a surface that faces a recording medium;
forming a non-magnetic insulating layer on the main magnetic pole layer including the at least one stepped portion;
forming at least one stepped portion on an upper surface of the non-magnetic insulating layer so that a thickness of the non-magnetic insulating layer at the rear in a height direction is larger than a thickness of the non-magnetic insulating layer at a front end surface exposed to the surface that faces the recording medium; and
forming a return path layer made of a magnetic material on the non-magnetic insulating layer that includes the at least one stepped portion.

10. The method of manufacturing a perpendicular magnetic recording head according to claim 9,
wherein one stepped portion is formed on an upper surface of the non-magnetic insulating layer, and
the return path layer includes a first throat portion that faces the main magnetic pole layer on the front end surface exposed to the surface that faces the recording medium with a first gap length therebetween, and a second throat portion that extends closer to the rear side in the height direction than the first throat portion and faces the main magnetic pole layer with a second gap length larger than the first gap length therebetween.

11. The method of manufacturing a perpendicular magnetic recording head according to claim 9,
wherein when a plating thickness and a maximum depth of the return path layer are defined as tR2 and Th2, respectively, the conditional expression tR2<Th2 is satisfied.

* * * * *

UNITED STATES PATENT AND TRADEMARK OFFICE
CERTIFICATE OF CORRECTION

| | |
|---|---|
| PATENT NO. | : 7,643,246 B2 |
| APPLICATION NO. | : 11/518723 |
| DATED | : January 5, 2010 |
| INVENTOR(S) | : Hisayuki Yazawa et al. |

Page 1 of 1

It is certified that error appears in the above-identified patent and that said Letters Patent is hereby corrected as shown below:

<u>In the Claims</u>

In column 13, claim 7, line 29, before "extends from the surface" insert --that--.

Signed and Sealed this

Fifteenth Day of June, 2010

David J. Kappos
*Director of the United States Patent and Trademark Office*